(12) United States Patent  
Urita

(10) Patent No.: US 6,219,036 B1  
(45) Date of Patent: Apr. 17, 2001

(54) ELECTRONIC EQUIPMENT WITH POINTING DEVICE

(75) Inventor: Kenji Urita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/237,911

(22) Filed: Jan. 27, 1999

(30) Foreign Application Priority Data

Jun. 23, 1998 (JP) .................................................. 10-176314

(51) Int. Cl.$^7$ ...................................................... G09G 5/08
(52) U.S. Cl. ........................... 345/161; 345/157; 345/160
(58) Field of Search ..................................... 345/157, 158, 345/160, 161, 163

(56) References Cited

U.S. PATENT DOCUMENTS 5,914,702 * 6/1999 Derocher et al. .................... 345/157

FOREIGN PATENT DOCUMENTS

| 2 266 360 | 10/1993 | (GB) . |
| 57-8830 | 1/1982 | (JP) . |
| 4-284526 | 10/1992 | (JP) . |
| 5-250069 | 9/1993 | (JP) . |
| 8-30385 | 2/1996 | (JP) . |

* cited by examiner

Primary Examiner—Richard Hjerpe  
Assistant Examiner—Duc Dinh  
(74) Attorney, Agent, or Firm—Armstrong, Westerman, Hattori, McLeland and Naughton, LLP

(57) ABSTRACT

Disclosed herein is electronic equipment including a housing and a joystick unit. The housing accommodates an electronic circuit. The joystick unit is provided on the housing and electrically connected to the electronic circuit. The joystick unit includes a base member and a joystick displaceably provided to the base member for inputting coordinates (e.g., two-dimensional coordinates) according to a relative positional relation to the base member. The base member is supported rotatably between a first condition and a second condition. In the first condition, the base member and the joystick respectively face the inside and the outside of the housing, whereas in the second condition, the base member and the joystick respectively face the outside and the inside of the housing. In the case of using the joystick, the first condition is intended to be selected, whereas in the case of not using the joystick, the second condition is intended to be selected. Accordingly, by rotating the joystick unit with respect to the housing between the first and second conditions, the joystick is prevented from interfering with the use of another part of the electronic equipment when the joystick is not used.

11 Claims, 4 Drawing Sheets

ELECTRONIC EQUIPMENT WITH POINTING DEVICE

BACKGROUND OF THE INVENTION

1. Field of the Invention

The present invention relates to electronic equipment (e.g., an information processing device) with a pointing device.

2. Description of the Related Art

In recent years, an opportunity to use multimedia software such as game software and interactive movie software has increased in association with widespread use and higher performance of electronic equipment, e.g., mobile personal computers. In running this kind of software, it is effective to use a joystick rather than use a keyboard only. The joystick is displaceably provided to a base member, for example, and coordinates (e.g., two-dimensional coordinates) or a direction at any coordinates can be input according to a relative positional relation between the joystick and the base member.

Although electronic equipment having a configuration allowing connection of a joystick is known, the joystick to be connected is almost a large-sized one for a desktop computer. Accordingly, it can be said that such conventional electronic equipment is inferior in portability.

It may be proposed to incorporate a joystick into electronic equipment. In this case, however, there is a possibility that when the joystick is not used, the joystick may interfere with the use of another part (e.g., a keyboard unit).

SUMMARY OF THE INVENTION

It is therefore an object of the present invention to provide electronic equipment with a joystick (or pointing device) which is improved in portability.

It is another object of the present invention to provide electronic equipment with a joystick (or a pointing device) which can eliminate the possibility that when the joystick (or the pointing device) is not used, the joystick (or an operation member of the pointing device) may interfere with the use of another part.

In accordance with an aspect of the present invention, there is provided an electronic equipment or an apparatus which includes a housing and a joystick unit. The housing accommodates an electronic circuit, for example. The joystick unit is provided on the housing and electrically connected, for example, to the electronic circuit. The joystick unit includes a base member and a joystick displaceably provided to the base member for inputting coordinates (e.g., two-dimensional coordinates) or a direction at any coordinates according to a relative positional relation to the base member. The base member is supported rotatably between a first condition and a second condition. In the first condition, the base member and the joystick respectively face the inside and the outside of the housing, whereas in the second condition, the base member and the joystick respectively face the outside and the inside of the housing.

With this configuration, the electronic equipment itself includes the joystick, so that the portability of the electronic equipment with the joystick is improved as compared with the case of using a joystick and electronic equipment having a configuration allowing connection of the joystick.

Furthermore, in the case of using the joystick, the first condition is intended to be selected, whereas in the case of not using the joystick, the second condition is intended to be selected. Accordingly, by rotating the joystick unit with respect to the housing, the joystick is prevented from interfering with the use of another part of the electronic equipment when the joystick is not used.

According to a preferred embodiment of the present invention, the electronic equipment further includes a lock mechanism for locking each of the first and second conditions. In this case, the joystick unit in each of the first and second conditions is stabilized by the lock mechanism. For example, the operability of the joystick used in the first condition is improved.

Preferably, the housing includes a housing body and a cover member openably provided to the housing body, and the joystick unit is provided on the housing body. In this case, by closing the cover member with respect to the housing body, the portability of the electronic equipment is further improved. Accordingly, this preferred embodiment is suitable for a laptop, notebook, or any other portable information processing device. Particularly in the case that a keyboard unit is provided on the housing body and a display unit is provided on the cover member, an operator can use the joystick as viewing the display unit. Furthermore, when the joystick is not used, the joystick does not interfere with the use of the keyboard unit.

Preferably, the base member of the joystick unit has an outer surface forming a part of a substantially spherical surface. Accordingly, when the joystick is not used, the base member hardly interferes with the use of the keyboard unit. In addition, when restoring the first condition from the second condition to use the joystick, the base member can be easily rotated with an operator's finger.

Preferably, the joystick is movably fixed to the base member by a spring. Accordingly, the joystick can be easily displaced in an arbitrary direction at any coordinates. By making this direction correspond to a specific signal, the direction at any coordinates can be easily input.

Preferably, the joystick has an outer surface on which a plurality of first electrodes are provided, and the base member has an inner surface on which a plurality of second electrodes are provided so as to correspond to the first electrodes, wherein a direction at the coordinates is determined by contact of one selected from the first electrodes and one selected from the second electrodes.

Preferably, at least one button switch is provided on a surface adjacent to a surface of the housing on which the joystick unit is provided. For example, the button switch is used for difficulty setting in game software or triggering for a specific operation necessary for game processing (e.g., firing in shooting games).

In accordance with another aspect of the present invention, there is provided an electronic equipment or an apparatus which comprises a housing; a pointing device provided on the housing, the pointing device having an operation member to be operated by an operator for coordinate inputting; and a support unit for supporting the pointing device to the housing rotatably between a first condition where the operation member faces the outside of the housing and a second condition where the operation member faces the inside of the housing.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

A preferred embodiment of the present invention will now be described in detail with reference to the attached drawings.

Figure 1:
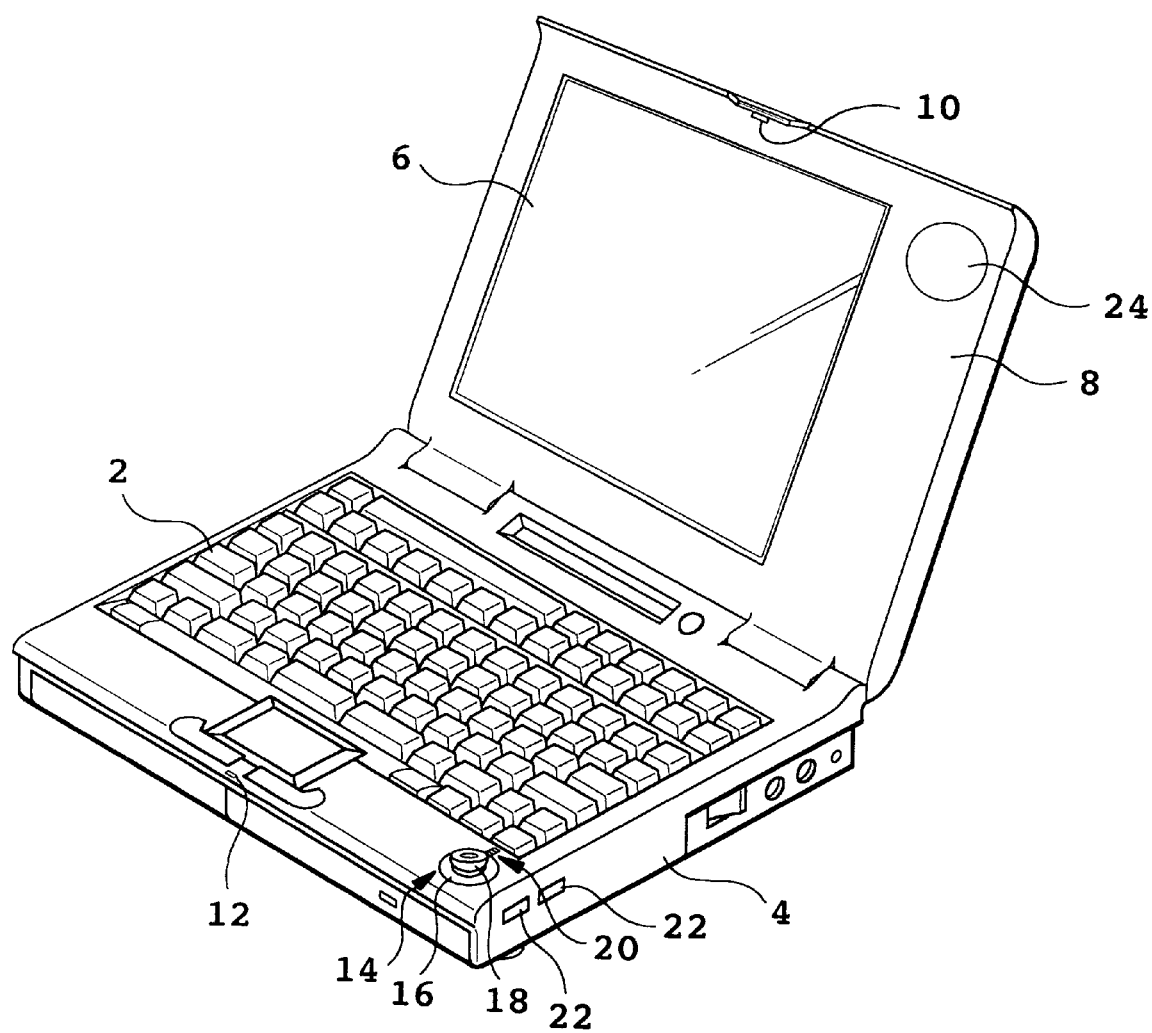
FIG. 1 is a perspective view showing a preferred embodiment of an information processing device to which the present invention is applied.

FIG. 1 is a perspective view showing a preferred embodiment of an information processing device to which the present invention is applied. This device may be a laptop, notebook, or any other portable information processing device (e.g., personal computer or word processor). This device includes a housing body 4 having a keyboard unit 2 and a cover member 8 having a display unit 6 such as a liquid crystal display (LCD). A housing of this device is provided by the housing body 4 and the cover member 8.

The cover member 8 can be opened and closed with respect to the housing body 4 by means of a hinge mechanism not shown. An open condition of the cover member 8 with respect to the housing body 4 as shown in FIG. 1 is suitable for input operations or the like in which an operator uses the keyboard unit 2 as viewing the display unit 6, whereas a closed condition of the cover member 8 with respect to the housing body 4 is suitable for transportation of the information processing device. The cover member 8 is provided with a hook member 10, and the housing body 4 is provided with a hole 12 for engaging the hook member 10. Accordingly, the closed condition of the cover member 8 can be maintained by engaging the hook member 10 with the hole 12. In this closed condition, the keyboard unit 2 and the display unit 6 are opposed to each other inside the housing, thereby ensuring protection of the keyboard unit 2 and the display unit 6.

A joystick unit 14 is provided in the vicinity of the keyboard unit 2 on the housing body 4. The joystick unit 14 includes a base member 16 rotatably supported to the housing body 4 and a joystick 18 displaceably provided to the base member 16 for inputting coordinates (e.g., two-dimensional coordinates) or a direction at any coordinates according to a relative positional relation with the base member 16 as will be hereinafter described. The base member 16, or the joystick unit 14 is rotatable with respect to the housing body 4 between a first condition where the base member 16 and the joystick 18 respectively face the inside and the outside of the housing body 4 and a second condition where the base member 16 and the joystick 18 respectively face the outside and the inside of the housing body 4.

A lock mechanism 20 for locking each of the first and second conditions is provided in the vicinity of the joystick unit 14 on the housing body 4. Details of the joystick unit 14 and the lock mechanism 20 will be hereinafter described.

In this preferred embodiment, the keyboard unit 2 and the joystick unit 14 are provided on an upper surface of the housing body 4, and at least one, e.g., two button switches 22 are provided on one side surface of the housing body 4 adjacent to the upper surface thereof. Further, the cover member 8 is formed with a depression 24 at a position corresponding to the joystick unit 14 in the closed condition of the cover member 8 with respect to the housing body 4, so as to accept projection of the joystick unit 14 in its first condition or its second condition from the housing body 4 and thereby obtain a well closed condition of the cover member 8 with respect to the housing body 4.

Figure 2:
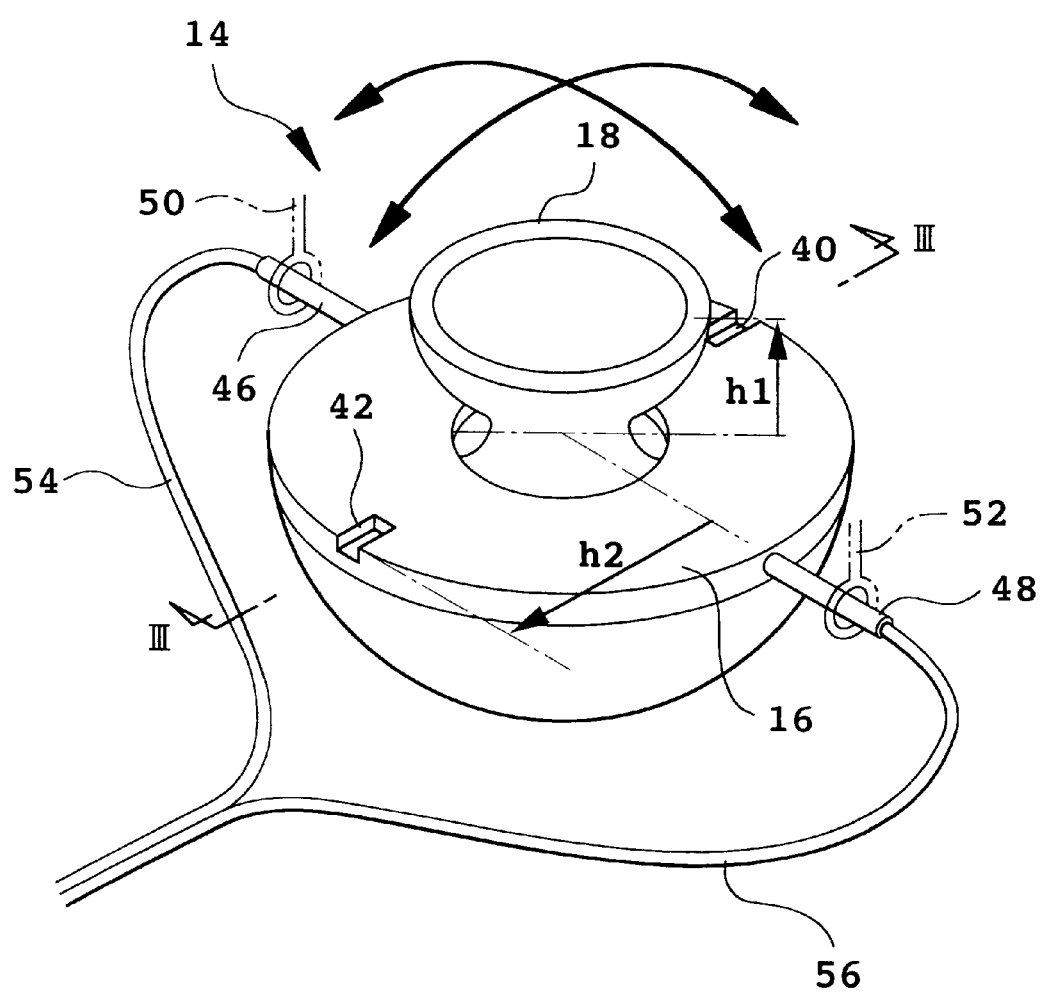
FIG. 2 is a perspective view of a joystick unit.
Figure 3:
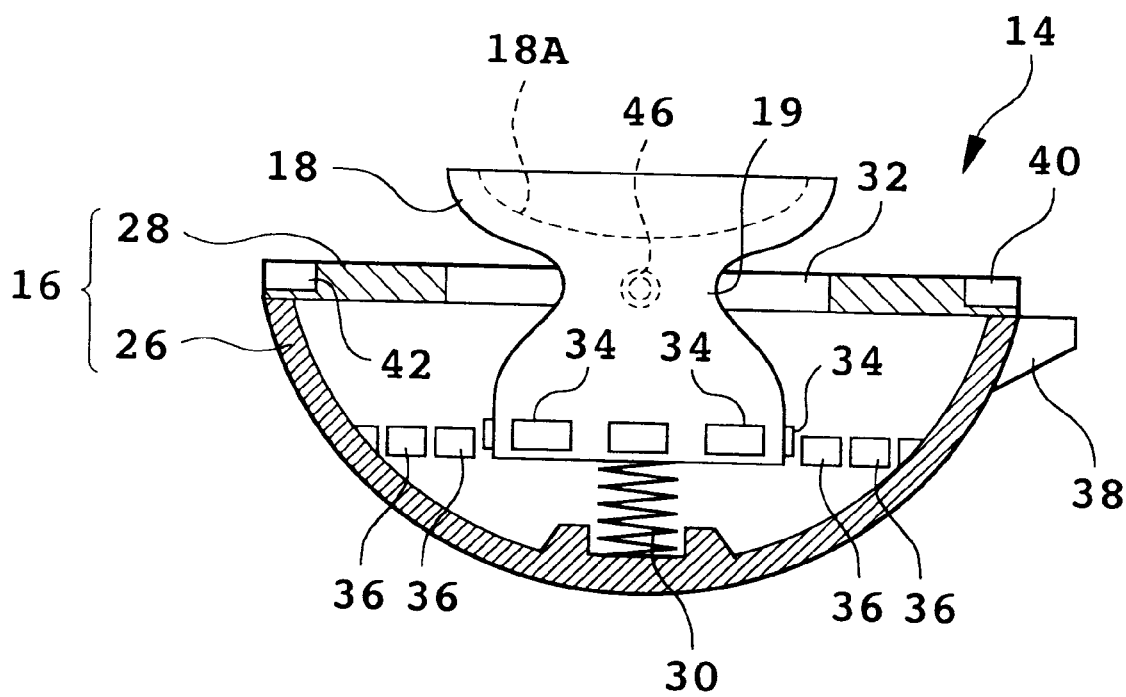
FIG. 3 is a cross section of the joystick unit taken along the line III—III in FIG. 2.

FIG. 2 is a perspective view of the joystick unit 14, and FIG. 3 is a cross section of the joystick unit 14 taken along the line III—III in FIG. 2.

As best shown in FIG. 3, the base member 16 of the joystick unit 14 is composed of a base body 26 having an outer surface forming a part of a substantially spherical surface, and a lid 28 fixed to the base body 26 so as to close an upper opening of the base body 26. The joystick 18 of the joystick unit 14 is movably fixed to the base body 26 by a spring 30. More specifically, one end of the spring 30 is mounted to a lower end of the joystick 18, and the other end of the spring 30 is fixed to an inner surface of the base body 26. The joystick 18 has a substantially circular cylindrical shape having a constriction 19 at a substantially middle position in its longitudinal (axial) direction. The joystick 18 has an upper end surface formed with a depression 18A for improving operability by an operator's finger. The lid 28 of the base member 16 has a circular shape with a central hole 32 through which the joystick 18 is passed. Accordingly, the joystick 18 is tiltable in arbitrary directions in such a range that the constriction 19 of the joystick 18 is limited by the central hole 32 of the lid 28.

A plurality of electrodes 34 are provided on the outer cylindrical surface of the joystick 18 in the vicinity of its lower end. For example, the electrodes 34 are arranged at equal intervals. On the other hand, a plurality of electrodes 36 are provided on the inner surface of the base body 26 of the base member 16 so as to correspond to the electrodes 34. When the joystick 18 is tilted in a certain direction, one of the electrodes 34 comes into contact with one of the electrodes 36 determined by the direction of tilting of the joystick 18. Accordingly, by providing a specific electronic circuit for determining the combination of one selected from the electrodes 34 and one selected from the electrodes 36, the direction of tilting of the joystick 18 can be input. Thus, an arbitrary direction at any two-dimensional coordinates, for example, can be input according to a relative positional relation between the joystick 18 and the base member 16.

The outer surface of the base body 26 is integrally formed at its upper edge portion with a projection 38 for maintaining each of the first and second conditions in cooperation with the lock mechanism 20 (see FIG. 1). Further, the lid 28 is formed with a recess 40 in the vicinity of the projection 38, and is further formed with another recess 42 at a position diametrically opposite to the recess 40.

As best shown in FIG. 2, the base member 16 is provided at its diametrically opposite positions with a pair of tubular shaft members 46 and 48 projecting outward in opposite directions along a straight line perpendicular to the line III—III. By inserting the shaft members 46 and 48 through bearings 50 and 52, respectively, the joystick unit 14 can be supported rotatably about the shaft members 46 and 48. For example, the bearings 50 and 52 are fixed to the inner surface of the housing body 4 (see FIG. 1) or are integral therewith.

A pair of cables 54 and 56 are inserted in the shaft members 46 and 48, respectively. The cables 54 and 56 are used to electrically connect the joystick unit 14 to an electronic circuit in the information processing device. More specifically, the electrodes 34 and 36 (see FIG. 3) are electrically connected respectively through the cables 54 and 56 to a printed wiring board (not shown) accommodated in the housing body 4, for example. In this case, a signal relating to a certain direction at two-dimensional coordinates, for example, is input through an I/O port (not shown) to a CPU (central processing unit) (not shown) mounted on the printed wiring board.

Figure 4A:
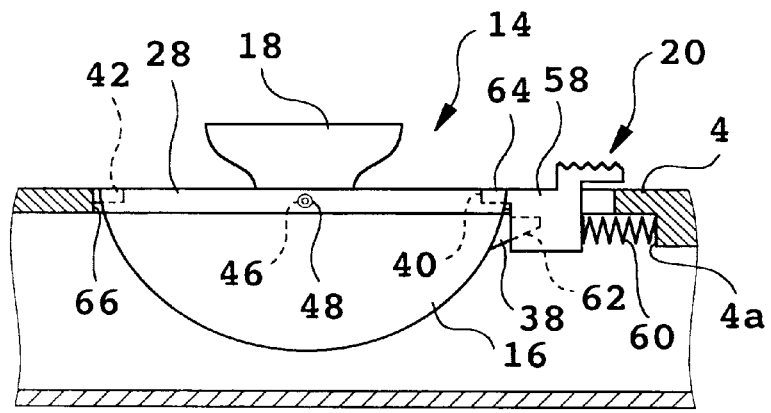
FIGS. 4A and 4B are sectional views for illustrating the operation of the joystick unit.
Figure 4B:
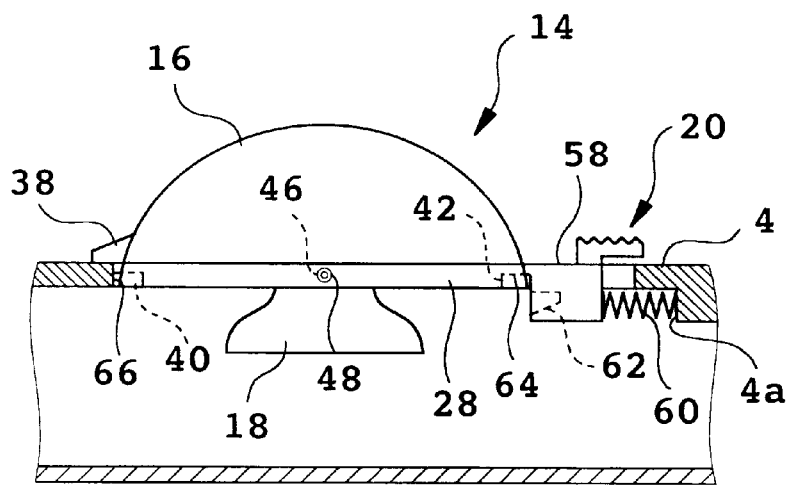

FIGS. 4A and 4B are sectional views for illustrating the operation of the joystick unit 14. In this preferred embodiment, the lock mechanism 20 includes a slider 58 slidably provided to the housing body 4. The slider 58 is normally biased leftward by a coil spring 60 as viewed in each of FIGS. 4A and 4B. The coil spring 60 is interposed between the slider 58 and a shoulder 4a formed on the inner surface of the housing body 4. The slider 58 has a hole 62 for engaging the projection 38 of the base member 16 and a projection 64 for engaging the recess 40 or 42 of the base member 16. The housing body 4 is formed with a circular opening 66 slightly larger in diameter than the lid 28 of the base member 16, so that the base member 16, or the joystick unit 14 is rotatable about the shaft members 46 and 48 within the opening 66.

FIG. 4A shows the first condition of the joystick unit 14. In the first condition, the projection 38 of the base member 16 is engaged with the hole 62 of the slider 58, and the projection 64 of the slider 58 is engaged with the recess 40 of the base member 16. This engaged condition is maintained by the coil spring 60, thus locking the first condition. In the first condition, input operations can be performed by using the joystick 18. In this case, the operator may place the thumb on the joystick 18 and put the forefinger and the middle finger on the two button switches 22 (see FIG. 1), thereby achieving easy and responsive input in the case of running game software, for example. To adapt the joystick unit 14 to the operator's right hand, the joystick unit 14 and the button switches 22 are preferably located on the right side of the housing body 4 as viewed from the front end thereof as shown in FIG. 1. When the slider 58 is moved rightward as viewed in FIG. 4A against the biasing force of the coil spring 60, the engaged condition of the base member 16 to the slider 58 in the first condition is canceled to thereby allow rotation of the joystick unit 14.

When the joystick unit 14 is rotated 180° counterclockwise as viewed in FIG. 4A, the second condition as shown in FIG. 4B is obtained. In the second condition, the projection 38 of the base member 16 is in contact with the upper surface of the housing body 4 in the vicinity of the opening 66, and the projection 64 of the slider 58 is engaged with the recess 42 of the base member 16. This engaged condition is maintained by the biasing force of the coil spring 60, thereby locking the second condition. In the second condition, the outer surface of the base member 16 forming a part of a substantially spherical surface is exposed to the outside of the housing body 4, so that the joystick unit 14 hardly interferes with input operations using the keyboard unit 2 (see FIG. 1).

To restore the first condition from the second condition, the slider 58 is moved rightward as viewed in FIG. 4B against the biasing force of the coil spring 60. Accordingly, the engaged condition of the base member 16 to the slider 58 in the second condition is canceled. By putting the operator's finger to the outer surface of the base member 16 in this free condition thereof, the joystick unit 14 can be easily rotated clockwise as viewed in FIG. 4B to restore the first condition shown in FIG. 4A.

While no specific space for the joystick unit 14 only is defined between the upper plate and the lower plate of the housing body 4 in this preferred embodiment, such a specific space may be defined to obtain a closed structure. In this case, the depth of this space is set greater than the height of the joystick 18 from the shaft members 46 and 48 and greater than the depth of the base member 16 from the shaft members 46 and 48.

As best shown in FIG. 2, the maximum radius h1 in the locus of rotation of the joystick 18 is preferably set smaller than the maximum radius h2 in the locus of rotation of the base member 16. With this setting, the joystick 18 can be rotated within the opening 66 of the housing body 4 (see FIG. 4A) even when there is defined a slight clearance between the opening 66 and the base member 16, thereby preventing entry of dust or the like through this clearance into the housing body 4.

While the joystick 18 has a substantially circular cylindrical shape having the constriction 19 in this preferred embodiment, a simple rodlike joystick or a prismatic joystick may be adopted.

Further, while the lid 28 of the base member 16 is substantially circular in plan to be adapted to be base body 26 of the base member 16 having an outer surface forming a part of a substantially spherical surface, the present invention is not limited to this preferred embodiment. For example, a base member rectangular as viewed in plan may be adopted.

The information processing device according to this preferred embodiment has a portable configuration as shown in FIG. 1. Accordingly, when the cover member 8 is in the open condition with respect to the housing body 4, the operator can comfortably use the joystick unit 14 as viewing the display unit 6. On the other hand, when the cover member 8 is in the closed condition with respect to the housing body 4, the portability of the information processing device is improved because the joystick unit 14 is received in the depression 24 of the cover member 8.

The base member 16 has an outer surface forming a part of a substantially spherical surface, and this outer surface is exposed to the outside of the housing body 4 in the second condition shown in FIG. 4B. Accordingly, the joystick unit 14 hardly interferes with input operations using the keyboard unit 2.

A direction at any two-dimensional coordinates can be input owing to the specific arrangement of the electrodes 34 and 36 as shown in FIG. 3. Accordingly, responsiveness and accuracy in inputting a direction can be ensured. For example, to determine a vertical direction, a horizontal direction, and 45° oblique directions, the number of the electrodes 34 of the joystick 18 is set to eight and these eight electrodes 34 are arranged at equal intervals.

Having thus described a specific preferred embodiment of the present invention applied to a joystick, any other pointing devices such as a digitizer and a flat panel may be rotatably configured like the joystick unit in accordance with the present invention. That is, the joystick unit in the present invention is to be broadly construed as a pointing device having an operation member to be operated by an operator for coordinate inputting.

According to the present invention as described above, it is possible to provide electronic equipment with a joystick (or pointing device) which is improved in portability. Further, it is possible to provide electronic equipment with a joystick (or pointing device) which can eliminate the possibility that when the joystick is not used, the joystick (or operation member of the pointing device) may interfere with the use of another part (e.g., a keyboard unit). The effects by the specific preferred embodiment of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. Apparatus comprising:

a housing body;

a joystick unit provided on said housing body, said joystick unit comprising a base member and a joystick displaceably provided to said base member and inputting coordinates according to a relative positional relation to said base member; and a support unit supporting said base member to said housing body rotatably between a first condition where said base member and said joystick respectively face the inside and the outside of said housing body and a second condition where said base member and said joystick respectively face the outside and the inside of said housing body.

2. Apparatus according to claim 1, further comprising a lock mechanism locking each of said first and second conditions.

3. Apparatus according to claim 1, further comprising a cover member openably provided to said housing body.

4. Apparatus according to claim 3, further comprising:

a keyboard unit provided on said housing body; and a display unit provided on said cover member.

5. Apparatus according to claim 1, wherein said base member has an outer surface forming a part of a substantially spherical surface.

6. Apparatus according to claim 1, wherein said joystick unit further comprises a spring movably fixing said joystick to said base member.

7. Apparatus according to claim 1, wherein:

said joystick has an outer surface on which a plurality of first electrodes are provided; and said base member has an inner surface on which a plurality of second electrodes are provided so as to correspond to said first electrodes;

a direction at said coordinates being determined by contact of one selected from said first electrodes and one selected from said second electrodes.

8. Apparatus according to claim 1, further comprising at least one switch provided on a surface adjacent to a surface of said housing body on which said joystick unit is provided.

9. Apparatus comprising:

a housing body;

a cover member hinged to said housing body, said cover member having a display unit mounted thereon;

a pointing device provided on said housing body, said pointing device having an operation member to be operated by an operator for coordinate inputting; and a support unit supporting said pointing device to said housing body rotatably between a first condition where said operation member faces the outside of said housing body and a second condition where said operation member faces the inside of said housing body.

10. Apparatus according to claim 9, further comprising a lock mechanism locking each of said first and second conditions.

11. Apparatus according to claim 9 further comprising:

a keyboard unit provided on said housing body; and a display unit provided on said cover member.

* * * * *